G. DRAPER.

Spindles for Spinning-Machines.

No. 6,016. Reissued Aug. 18, 1874.

Witnesses.
J. N. Piper
L. N. Holden

George Draper
by his attorney
R. H. Eddy

UNITED STATES PATENT OFFICE.

GEORGE DRAPER, OF HOPEDALE, MASSACHUSETTS.

IMPROVEMENT IN SPINDLES FOR SPINNING-MACHINES.

Specification forming part of Letters Patent No. 127,159, dated May 28, 1872; reissue No. 6,016, dated August 18, 1874; application filed July 2, 1874.

*To all whom it may concern:*

Be it known that I, GEORGE DRAPER, of Hopedale, of the county of Worcester and State of Massachusetts, have made an invention having reference to Machinery for Spinning; and do hereby declare the same to be fully described in the following specification and represented in the accompanying drawings, of which—

Figure 1:
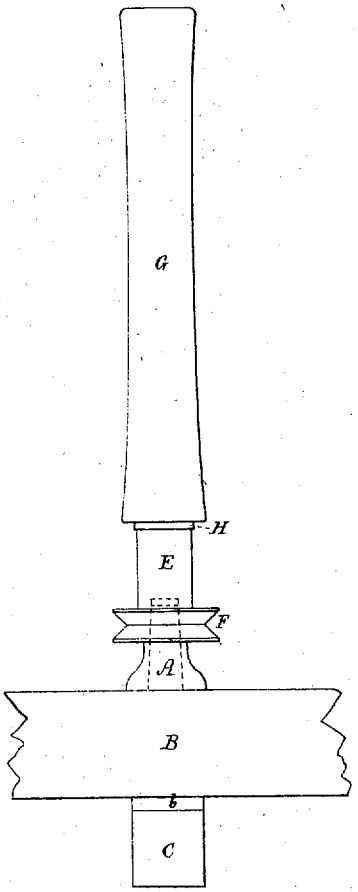
Figure 2:
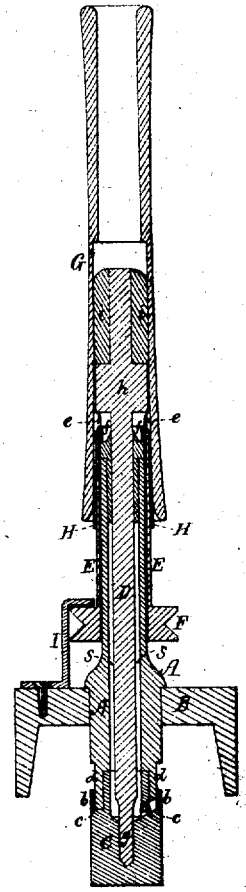
Figure 2:
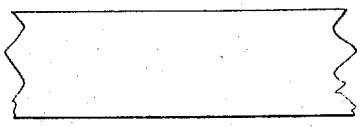
Figure 2:
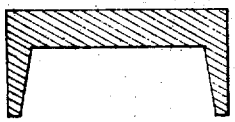

Figure 1 is a front elevation, and Fig. 2 a vertical and transverse section, of spinning machinery made in accordance with my invention.

In such drawings, A denotes a tubular bolster or standard, elevated on a supporting-rail, B, and extended down through it, and terminating at bottom in, or being fixed to, a close spindle-step, C, furnished with an induct, *a*, and also with a cover or encompassing cap or slide, *b*. The said cover or slide is a short tube, which, when in its lowest position, rests on a shoulder, *c*, of the step and encompasses the bolster-foot *d*, it being capable of being moved upward on the foot, so as to uncover the induct in order to admit of oil being introduced therein. With the said bolster a "compound live spindle" is used, it being composed of a spindle, D, and a sleeve, E, arranged concentrically and fastened together at the upper end of the sleeve. The sleeve terminates at bottom in or has applied to it a whirl, F, and such sleeve extends down upon and encompasses the bolster, in manner as shown. At and just above the upper end of the latter there are one or more oiling-inducts, *e*, made in the sleeve, whereby oil may be introduced through such hole or holes directly upon the upper end of the bolster, or into the oil chamber or groove *f* made therein. The spindle D extends down through the bolster, takes a bearing in the upper part thereof, and thence, without further contact with the interior of the bolster, has its pivot *g* supported by the step, the space *s* around the spindle and within the bolster being sufficiently large to cause that part of the spindle which is therein to always run freely in air. The spindle D has its upper part *h* crowned by a collar or extension, *i*, of wood, which, made as a tube, encompasses and fits and is fastened to the upper part of the spindle. Such tube or collar *i* serves as a bearing to the bobbin G. The said bobbin is chambered or bored lengthwise, to extend down upon and encompass the sleeve in manner as represented, the bobbin being supported by the aforesaid cylindrical extension *i* and a bearing or conical seat, H, formed and arranged upon the sleeve, in manner as represented. The conical seat admits of the bobbin being firmly held to the sleeve, the cylindrical extension not only serving to steady the bobbin, but to admit of its being pressed down firmly upon the seat, as circumstances may require. Furthermore, the bobbin serves as a cap or shield to the oil hole or holes of the sleeve, as it encompasses and extends below such hole or holes, so as to prevent any dirt or fibers from gaining, by means of such hole or holes, access to the spindle and bore of the bolster. A turn-button, I, formed and arranged upon the bolster-rail, as represented, serves, when extended over the whirl, to prevent the sleeve from being raised off or upon the bolster while the bobbin may be in the act of being raised off the sleeve. Sometimes I reverse the positions of the conical seat and the straight or cylindrical guide or support of the bobbin, in which case the conical seat will be above the upper end of the sleeve; but this arrangement of the parts I do not deem so advantageous as that exhibited in the drawings. The bobbin is constructed with its bore tapering where it is to fit to the conical seat H, and where it is to encompass the straight or cylindrical extension or guide *i* the said bore is to be straight or cylindrical, all being essentially as shown.

In several respects my spinning mechanism is analogous to that of Rabbeth & Atwood, described and represented in their Patent No. 63,561. The two, however, differ in some important particulars. In my mechanism the bobbin, instead of being wholly above the sleeve and held to it by pins or studs, and being sustained by the spindle, as it is in Rabbeth & Atwood's mechanism, extends down upon and encompasses the sleeve and its oil-induct or inducts, so as to cover the latter. The bobbin also has a bearing upon the spindle or part *i* thereof, and also fits to and has another adhesive or friction bearing upon the sleeve E or the conical seat or part H thereof. The step of the spindle has its separate oil induct and loose-fitting cap or covering-tube, and therefore its supply of oil is not dependent upon the oil-reservoir at the head of the bolster. That part of the spindle which is below the bearing at the said reservoir, at the head of the bolster, and between such and the step, does not run in oil, or is not and cannot be submerged in oil, as does the spindle of Rabbeth & Atwood, because the oil would escape out of the oiling-induct of the step, and therefore such part of the spindle is not liable to be impeded by the oil becoming thickened and gummed upon it.

Furthermore, no part of the spindle D that is below the top of the sleeve is exposed in a manner to admit of it intercepting and winding upon itself any loose thread or threads.

In practice it has been found that a spindle running in oil, as indicated in Patents 30,937 and 63,561, requires more power to revolve it than when exposed to oil only at its bearing-surfaces on the step and bolster, for in the former case the spindle soon becomes covered by a coating or deposit, which creates so great an amount of friction that generally one horse-power, under such circumstances, will drive only about seventy spindles, when it would suffice to operate about one hundred and twenty with the spindle when not immersed in oil between the bolster and step.

Spindles to drive bobbins have heretofore been made, generally, in two ways, in one of which the spindle was cylindrical, with a corresponding bore in the bobbin, in which case the bobbin was usually driven by pins entering its head or by friction beneath the head. In the other case the spindle has been tapering, and the bobbin driven by frictional contact therewith in two different places.

In the case where the bobbin is driven by frictional contact with the tapering spindle or sleeve, it has been found very difficult to get the spindles made exactly alike, and the bobbins also so constructed that each could be used on any of the spindles or sleeves. To avoid the difficulties incident to such constructions I have adopted the plan of employing the conical seat and the straight or cylindrical guide, as hereinbefore mentioned, which brings the bobbin always to a good bearing in one place, and prevents the tendency of it to rise on the spindle which it has when supported by two tapering bearings, or one long tapering bearing only. Such a tendency to rise on the spindle determines the limit of production of yarn, so that if estopped or overcome, the amount of yarn spun may be much increased.

I would remark that I do not claim the mechanism or any part thereof described in said Rabbeth and Atwood's patent. Neither do I claim a sleeve and bobbin constructed and arranged and combined with a dead spindle, in manner as shown in either of the United States Patents 119,032 or 124,488; nor do I claim anything shown in the aforesaid Patent No. 30,937.

I claim as my invention as follows, that is to say:

1. In combination with the compound spindle having the whirl fixed to its sleeve, the bobbin fitted to that part of the said compound spindle which is above the sleeve thereof, and extended downward, so as to encompass the sleeve.

2. The bobbin made with the cylindrical upper bearing and the lower tapering bearing, in combination with the compound live spindle, provided with the cylindrical and tapering counter-bearings, arranged as set forth.

3. The combination of the compound live spindle and the whirl, fixed to the lower part of the sleeve thereof, with the bobbin extended down around the sleeve, and bearing thereon and on the part of the spindle which is above the sleeve.

4. The compound live spindle and the whirl fixed thereto, combined with the bolster extended up within the sleeve of the spindle, and with the bobbin encompassing the sleeve, and bearing thereon and on that part of the spindle which is above the sleeve.

5. The bobbin encompassing the sleeve and its spindle above the whirl, in combination with the bolster extended up into the sleeve, and with the turn-button or hook I, all substantially as described.

6. The whirl, the compound live spindle D E, and the bolster A, arranged substantially as set forth, when combined with the bobbin, so applied to the said spindle as to encompass it and have bearings upon the parts of it extending both above and below the top of the bolster.

7. In combination with the bolster A and compound spindle D E, provided with one or more oiling-openings, *e*, extended through the sleeve E of the said spindle, and with respect to the bolster A, as described, the bobbin G arranged to encompass the sleeve E, and extend beyond and cover the said oiling hole or holes, as set forth.

8. In combination with the bolster A and compound live spindle D E, arranged and provided with the one or more oiling openings *e*, substantially as described, the closed step C, provided with the oil-induct *a* and the capring *b*, thereto arranged as represented.

9. The combination of the wooden extension or bearing *i* with the compound live spindle, such being to operate with the bobbin as set forth.

GEORGE DRAPER.

Witnesses:
R. H. EDDY,
J. R. SNOW.